June 3, 1941.                J. G. MOLD                2,243,975
                      POTATO PICKER AND GRADER
                      Filed March 9, 1939            2 Sheets-Sheet 1
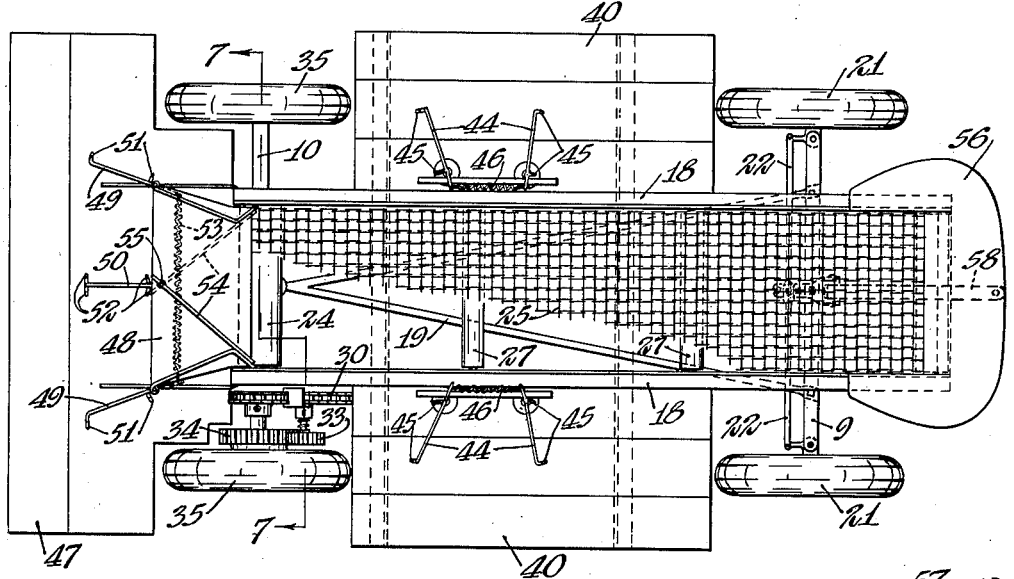
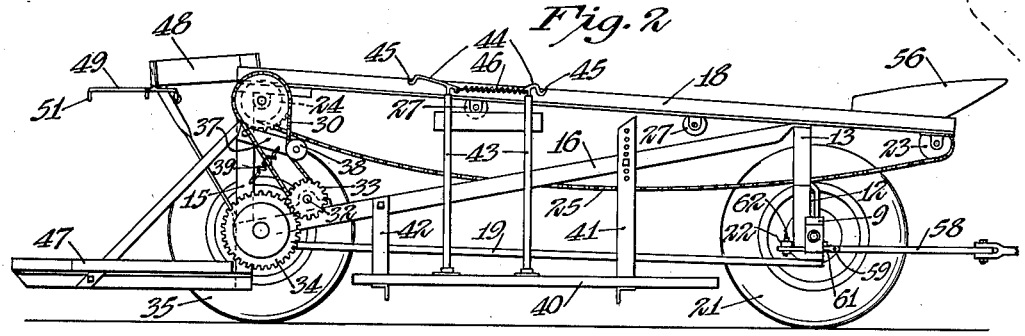
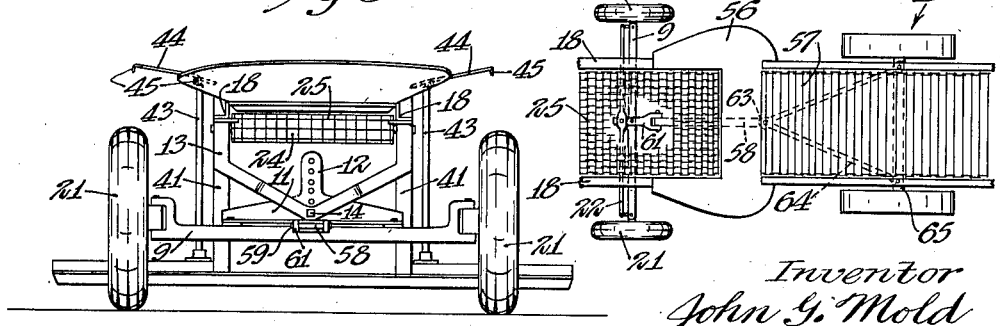
Inventor
John G. Mold
By Williamson & Williamson
Attorneys June 3, 1941.   J. G. MOLD   2,243,975
POTATO PICKER AND GRADER
Filed March 9, 1939   2 Sheets-Sheet 2

Inventor
John G. Mold
By Williamson & Williamson
Attorneys

Patented June 3, 1941

2,243,975

UNITED STATES PATENT OFFICE 2,243,975

POTATO PICKER AND GRADER

John G. Mold, Harris, Minn.

Application March 9, 1939, Serial No. 260,706

9 Claims. (Cl. 55—51)

This invention relates to potato harvesters, and more particularly to the combination of a digger elevator and a grading machine.

One of the objects of the invention is to provide a potato grader which can be drawn behind the digger by means of draw bar connections between the machines and in such a manner that provision is made for depositing potatoes upon the conveyor of the grader from the elevator on the digging machine regardless of angles which the grader and picker may assume relative to each other in making turns both at the ends of rows and along rows where they are not straight. Such a machine is of particular importance where contour planting is practiced. Contour crop arrangement is becoming more widely used since the relatively recent emphasis upon proper agricultural practices to prevent erosion.

A more specific object of the invention is to provide means for directing potatoes to the end of the grader conveyer in combination with a draw bar construction which provides for a vertical pivot connection between the grader and the digger which is definitely positioned in relation to the discharge end of the digger elevator and the means for receiving and directing potatoes to the grader conveyer.

Another object of the invention is to provide an improved grader construction which will ride relatively steadily and is subject to less strain than other types of construction.

A further object of the invention is to provide a grader construction which can be easily adjusted for connection and proper operation in combination with various types and sizes of diggers.

These and other objects and advantages of the invention will more fully appear from the following description made in connection with the accompanying drawings, wherein like reference characters refer to the same parts throughout the views, and, in which:

Fig. 1 is a plan view of the grader;

Fig. 2 is a side elevation with the rear wheels removed and the upper end portion of the digger elevator in dotted lines;

Fig. 3 is a front end elevation;

Fig. 4 is a more or less diagrammatic plan of the rear end of the digger and the front end of the grader with their draw bar connection;

Figure 5:
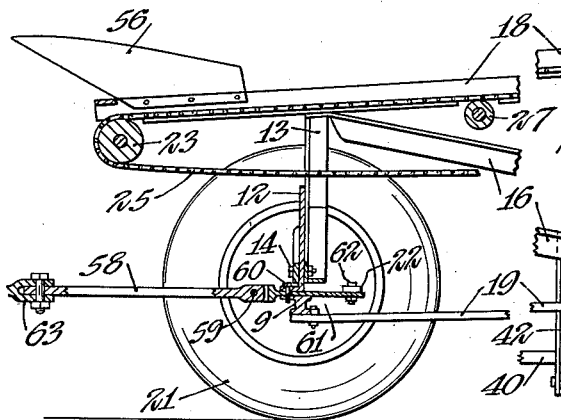
Figure 6:
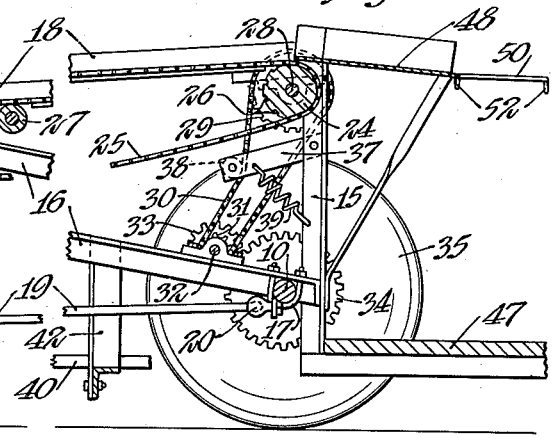
Figure 7:
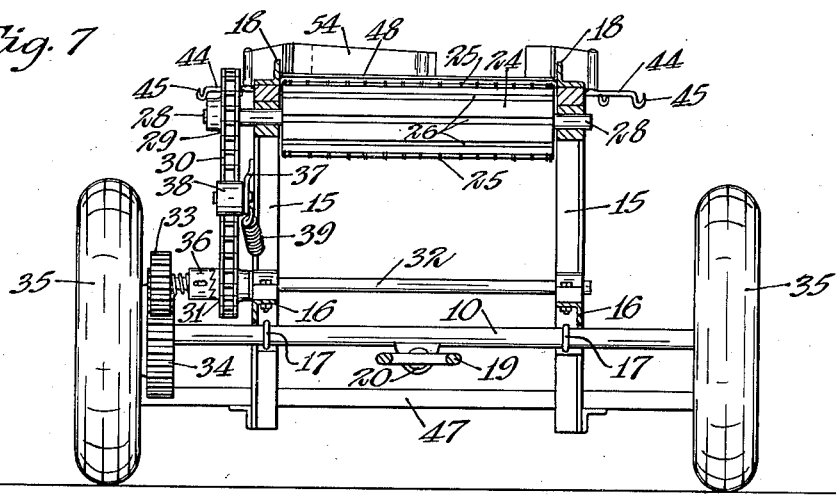
Figure 8:
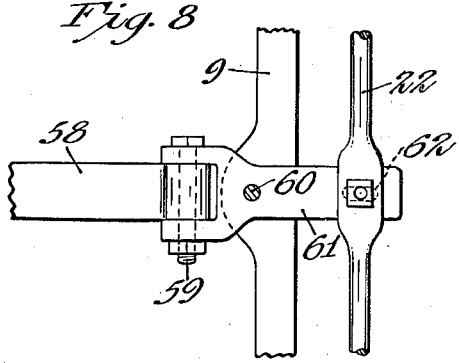
Figure 9:
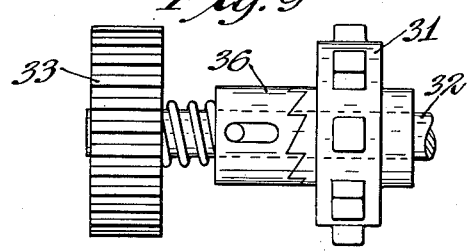

Fig. 5 it a longitudinal vertical section through the forward end of the grader;

Fig. 6 is a longitudinal vertical section through the rear end of the grader;

Fig. 7 is a transverse section through the rear end of the grader approximately on the line 7—7 of Fig. 1;

Fig. 8 is an enlarged detail of the draw bar and steering connection at the forward end of the grader; and Fig. 9 is an enlarged detail of a portion of the drive connection and clutch in the gear train which drives the grader conveyer.

The grader is mounted upon a fixed front axle 9 and a fixed rear axle 10 which, of course, carry wheels as shown. The front axle has a vertically extending plate 11 with a central tongue 12 having a plurality of apertures therein as shown in Fig. 3. A front frame cross member 13 is more or less V-shaped and converges downwardly to a central point and is connected to the vertical plate 11 at its tongue 12 by means of a bolt 14 which extends through the V-shaped front cross member and through one of the apertures in the tongue 12. Thus the forward end of the frame can be adjusted vertically and is also adapted to rock laterally for a reason to be brought out below. A pair of rear frame uprights 15 are secured to slanting longitudinal side frame members 16 which are notched at their rear ends to fit over the rear axle 10 and retained thereon by saddle bolts 17. A pair of upper longitudinal side frame members 18 extend rearwardly from the upper ends of the arms of the V-shaped front frame cross member 13 to the upper ends of the rear frame uprights 15. A substantially V-shaped radius rod 19 has the ends of its arms secured to the front axle 9 and its point is connected to the rear axle 10 by means of a ball joint 20. This construction provides a rigid frame and in traveling over uneven ground, such as is encountered in the field, the front and rear axles can tip laterally without imposing any strain upon the frame work due to the single pivoted point of connection between the front frame member and the front axle. The front wheels 21 are mounted on spindles at the ends of the front axle 9 and a steering connecting rod 22 connects the two wheels so that they can be steered together.

Mounted between the ends of the side frame member 18 are cylindrical rollers 23 and 24. The rollers carry a link belt endless conveyer 25 and the cross ridges of the conveyer belt are adapted to fit into grooves 26 on the rear roller 24. A plurality of intermediate idler rollers 27 are positioned at convenient points between the frame side members 18 to support the link belt 25. The rear roller shaft 28 carries a sprocket 29 which is connected by a chain 30 to a sprocket 31 on a cross shaft 32 mounted between the slanting side frame members 16. The shaft 32 extends laterally of the frame on one side and its end carries a gear 33 which meshes with a larger gear 34, the latter being secured to one of the rear wheels 35. When viewed in Fig. 2, forward motion of the grader causes clockwise rotation of the rear wheels 35 driving the chain 30, upper sprocket 29 and grooved rear roller 24 in a counter-clockwise direction to cause the upper run of the conveyer 25 to move rearwardly. The cross shaft 32 which carries the sprocket 31 and the small gear 33 also carries a toothed clutch sleeve 36 which cooperates with a toothed portion of the sprocket 31 so that the drive may be engaged and disengaged. The clutch actuating mechanism is not shown since it is of conventional construction. An arm 37 pivoted to one of the vertical rear frame members carries a roller 38 which bears against the sprocket chain 30 under influence of a spring 39 to keep the chain tight.

Potatoes taken from the ground by the digger, indicated generally at D in Fig. 4, are deposited on the forward end of the conveyor belt 25 and carried rearwardly past workers who stand upon platforms 40 suspended from the side frames by means of brackets 41 and 42. Supported by the side frames and the platforms 40 are vertical posts 43 which carry outwardly extending arms 44 having hooks 45 at their ends. One or both of each of the pairs of arms 44 are pivoted on their supporting posts 43 and tension springs 46 tend to draw the inner ends of the arms 44 together to spread their outer ends. Bags are suspended from each of the pairs of arms 44 on the inner and outer hooks 45 and the spring tension of the arms maintains the mouths of the bags open.

At the rear end of the grader is a platform 47 upon which workers stand and the rear end of the upper run of the conveyor belt 25 feeds such potatoes as reach the rear end onto a chute 48, and at the rear edge of the chute a pair of pivoted arms 49 are provided at the sides and a rigid arm 50 extends rearwardly from the center of the chute. The arms 49 are provided with inner and outer hooks 51 and the rigid arm 50 is provided with oppositely disposed pairs of outer and inner hooks 52. Two bags are suspended between the rigid central arm 50 and the pivoted lateral arms 49 which are normally urged outwardly by a spring 53. A gate 54 is positioned vertically in the chute 48 and pivoted at 55. The gate can be swung from the full line position to the dotted line position shown in Fig. 1 so that one of the two bags at the rear of the grader can be filled, at which time the gate is swung to the other side to fill the empty bag beside the full one.

The front cross frame element 13 is arranged for vertical adjustment relative to the plate 11 and vertically extending tongue 12 which are rigidly secured to the front axle 9 so that the forward end of the grader conveyor belt 25 can be adjusted vertically relative to the discharge of the potato digging machine with which it is working. Naturally too great a drop of the discharge of the digger and the receiving end of the digger will not only bruise the crop but will cause a number of the potatoes to bounce or roll off of the grader. In order to insure deposit of the potatoes on the forward end of the grader conveyer belt 25, I provide an apron 56 which, as shown, slants upwardly from the front end of the conveyer and extends forwardly and laterally of said conveyer, and in order to further insure proper deposit of the potatoes on the grader conveyer I provide a draft rigging between the digger and the grader which has an important relationship to the forward end of the grader, the apron 56 and the upper discharge end of the digger elevator 57. A draw bar section 58 is connected by means of a horizontal pivot pin 59 and a vertical pivot 60 to the center of the front axle 9. A connecting link 61 extends rearwardly of the front axle 9 and is connected by means of a clamp 62 to the steering connecting rod 22. Any lateral swinging of the draw bar section 58 causes lateral movement of the steering connecting rod 22 and a resultant steering of the front wheels 21 as is common in many types of vehicle steering arrangements. The draw bar section 58 is connected by a vertical pivot 63 to a substantially V-shaped draw bar section 64 which is rigidly connected to the rear axle 65 of the digger D. It should be carefully noted in Figs. 2 and 4 that when the digger assumes an angle in turning and draws the grader after it, there will be a swinging movement of the draw bar section 58 from its pivotal connection with the grader axle 9, and the pivotal connection 63 between the two draw bar sections will swing in an arc beneath the potato receiving apron 56 and the upper rear end of the digger elevator 57 will be maintained in discharge position above the apron 56. This is extremely important in apparatus of this type since it is unnecessary to observe any more care in operating the apparatus while traveling in a curve than it is when traveling in a straight line. Even when the digger and the grader are at a decided angle to each other when executing an extremely sharp turn the apron 56 is always maintained in potato receiving position due to the relationship between said apron, the connecting pivot between the draw bar sections, and the upper discharge end of the digger conveyer 57.

As stated above the grader can not only be maintained in proper position relative to the discharge end of the conveyer on a turn, but the vertical adjustment of the front end of the conveyer makes it adaptable for connection with various sizes and types of diggers, and when the front end is raised or lowered the side platforms 40 can be adjusted in relation thereto since the forward platform supporting bracket 41 is provided with a plurality of openings as shown to permit raising and lowering of the forward end of the platform. Thus even though the position of the frame is changed, the workers on the side platforms can always stand upon a substantially level supporting surface.

From the foregoing description, it will be seen that I have provided a grader which is of strong yet flexible construction and which is operated by a simple drive mechanism. Furthermore, it is one which can accommodate a plurality of workers or sorters who can eliminate poor potatoes and properly grade the acceptable ones. One of the most important features of the invention is the relationship between the receiving apron 56 and the draw bar construction which insures proper deposit of potatoes on the receiving end of the grader conveyer belt 25 whether the apparatus is trailing straight behind the digger or whether turns are being executed. It will be further noted that the particular draw bar arrangement can be easily adapted to any type of potato harvesting machine.

It will, of course, be understood that various changes may be made in the form, details, arrangement and proportions of the various parts without departing from the scope of my invention.

What is claimed is:

1. A potato digger having an elevated crop discharge means, a wheeled frame, an endless conveyer mounted for movement on said frame, a draw bar connecting said digger and said wheeled frame and maintaining said digger and said conveyer in constant spaced relation, said conveyer having an end positioned adjacent to and lower than the upper end of said crop discharge means, a receiving apron around the end of said conveyer and beneath the upper end of said crop discharge means, and said draw bar having a vertical pivot joint positioned beneath said apron and the upper end of said crop discharge means.

2. A potato digger having an elevated crop discharge means extending longitudinally thereof, a wheeled frame, a longitudinally positioned endless conveyer mounted for movement on said frame, a draw bar connecting said digger and said wheeled frame and maintaining said digger and said conveyer in constant spaced relation, said conveyer having an end positioned adjacent to and lower than the upper end of said crop discharge means, a receiving apron around the end of said conveyer and beneath the upper end of said crop discharge means, and said draw bar having a vertical pivot joint positioned beneath said apron and the upper end of said crop discharge means.

3. The structure in claim 1, and said draw bar comprising a section secured to said digger against movement in a horizontal plane, and a section secured to said wheeled frame, and said sections having their adjacent ends joined by a vertical pivot.

4. The structure in claim 1, and the apron extending substantial distances forwardly and laterally of that end of said conveyer positioned beneath said crop discharge means.

5. A potato harvester comprising a digger having an elevated discharge device, a grader having a longitudinally disposed conveyer thereon, a draw bar connected between said digger and said grader, one section of said draw bar being secured to said digger against movement in a horizontal plane, the other section of said draw bar being pivotally connected for lateral swinging movement to the end of said grader, a vertical pivot connecting adjacent ends of said draw bar sections, said pivot lying substantially directly beneath said digger discharge, and the conveyer on said grader including a receiving end positioned beneath said digger discharge and between said discharge and the pivot connecting said draw bar sections, the location of said conveyer being such that it intersects a line between said discharge and said vertical pivot during alignment of the digger and grader and during movement of the digger relative to the grader to different angular positions.

6. A potato grader comprising a pair of axles, a substantially V-shaped cross frame element pivotally secured to a first axle of said pair at the point of the V and having upstanding lateral arms, a pair of vertical end frame elements secured to the second of said axles, side frame members connecting the arms of said pivoted cross member and said vertical end frame members, and a substantially V-shaped radius rod having its point pivotally secured to said second axle approximately at the center thereof and the arms of said radius rod being rigidly secured to said first axle adjacent its ends.

7. The structure in claim 6 and said frame having an endless conveyer mounted thereon, and the point of pivotal connection between said V-shaped cross frame member and its axle being vertically adjustable to permit adjustment of the elevation of an end of said conveyer.

8. The structure in claim 6 and said frame having an endless conveyer mounted thereon, the point of pivotal connection between said V-shaped cross frame member and its axle being vertically adjustable to permit adjustment of the elevation of an end of said conveyer, and a platform suspended from the sides of said frame intermediate its ends, said platform being pivotally secured to said frame at one end thereof, and a vertically adjustable connection between said frame and the opposite end of said platform.

9. In potato harvester apparatus, a grader comprising, a frame supported by front and rear axles and wheels, a conveyor mounted longitudinally of said frame, an apron extending laterally and longitudinally from the front end of said conveyor, a draw bar section pivotally secured to said front axle and swingable in its entirety in an arc beneath said apron, a digger having a discharge element, a draw bar section on said digger having a vertical pivot connecting it to the draw bar section on said front axle, and said digger draw bar section being rigidly secured to the digger against swinging movement in a horizontal plane, whereby the discharge device on said digger is maintained in a substantially constant position relative to said apron during turning movement of the harvesting apparatus.

JOHN G. MOLD.